United States Patent [19]

Pauwels et al.

[11] Patent Number: 4,600,993
[45] Date of Patent: Jul. 15, 1986

[54] MEASURING BAROMETRIC PRESSURE WITH A MANIFOLD PRESSURE SENSOR IN A MICROPROCESSOR BASED ENGINE CONTROL SYSTEM

[75] Inventors: Michael A. Pauwels, Williamsburg; Danny O. Wright, Grafton, both of Va.

[73] Assignee: Allied Corporation, Morris Township, Morris County, N.J.

[21] Appl. No.: 499,112

[22] Filed: May 27, 1983

[51] Int. Cl.⁴ ............... F02D 35/00; F02D 41/26; F02P 5/15
[52] U.S. Cl. .................. 364/431.05; 123/412; 123/416; 123/488; 364/431.10; 364/558
[58] Field of Search .......... 364/431.05, 431.06, 364/431.09, 431.10, 431.11, 431.12, 558; 123/412, 416, 417, 424, 488, 491, 494, 179 A

[56] References Cited

U.S. PATENT DOCUMENTS

| | | | |
|---|---|---|---|
| 4,157,699 | 6/1979 | Mori | 364/431.11 X |
| 4,271,797 | 6/1981 | McCarbery | 123/412 |
| 4,362,133 | 12/1982 | Malik | 123/179 A |
| 4,372,274 | 2/1983 | Takase | 123/424 X |
| 4,385,606 | 5/1983 | Hattori et al. | 123/416 |
| 4,442,812 | 4/1984 | Mizuno et al. | 123/417 |

FOREIGN PATENT DOCUMENTS

| | | | |
|---|---|---|---|
| 65703 | 12/1982 | European Pat. Off. | 364/431.11 |
| 3238153 | 4/1983 | Fed. Rep. of Germany | 364/431.11 |

*Primary Examiner*—Felix D. Gruber
*Attorney, Agent, or Firm*—Russel C. Wells; Markell Seitzman

[57] ABSTRACT

A method of measuring barometric pressure with a manifold pressure sensor (62) in a microprocessor based engine control system utilizes known engine operating conditions to interrogate the sensor. Also on engine turn-off, a power latch signal (158) is generated to delay power removal until the throttle valve (160) is driven open and the pressure sensor (62) is interrogated for its value. This value at this time is the ambient or barometric value of pressure. This value is stored in the microprocessor's (26, 28) memory (84, 86) and maintained by means of a standby voltage (80). During engine operation, the pressure sensor (62) is interrogated and value of the stored barometric pressure is changed by one unit of pressure if the stored and measured values are unequal.

7 Claims, 13 Drawing Figures

Fig·1

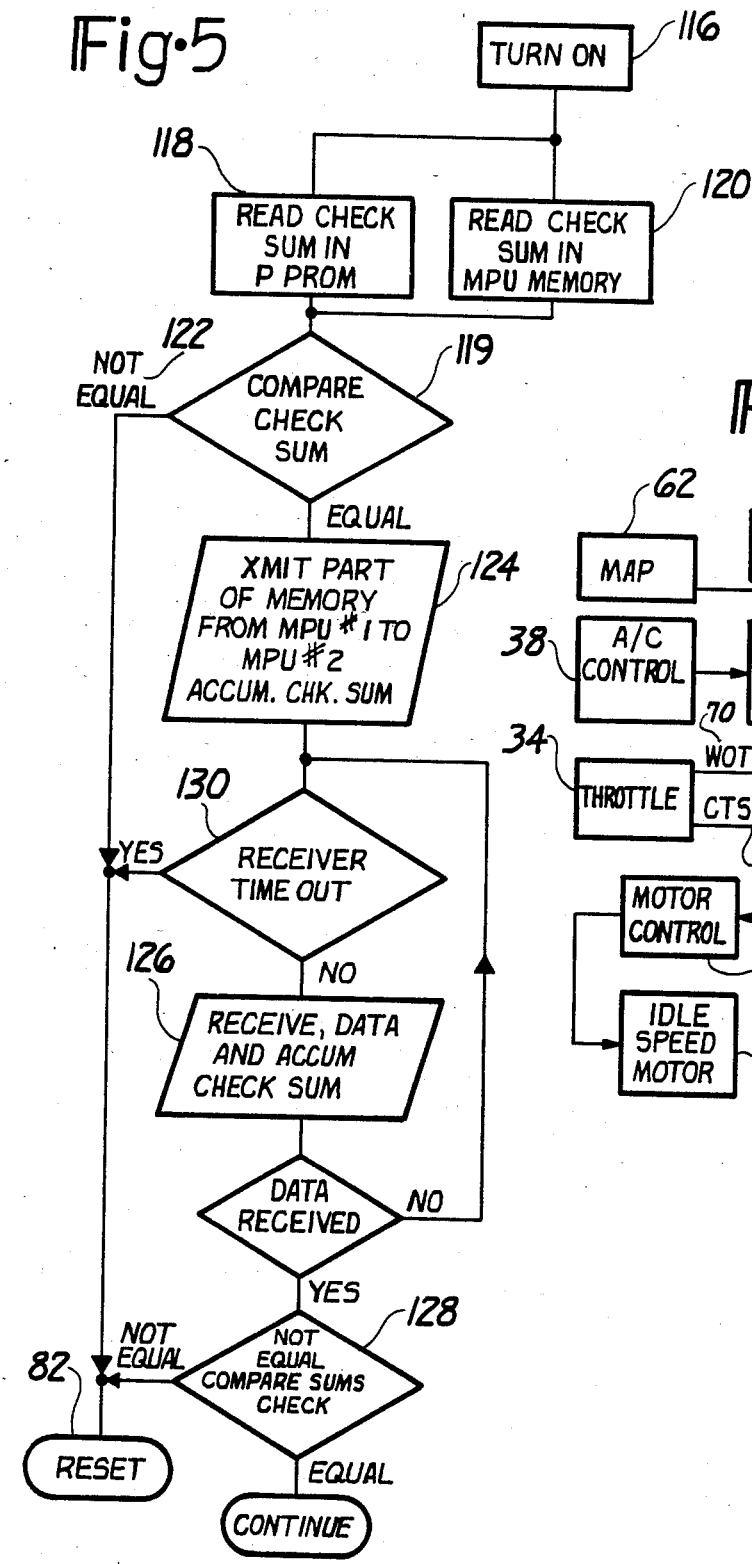
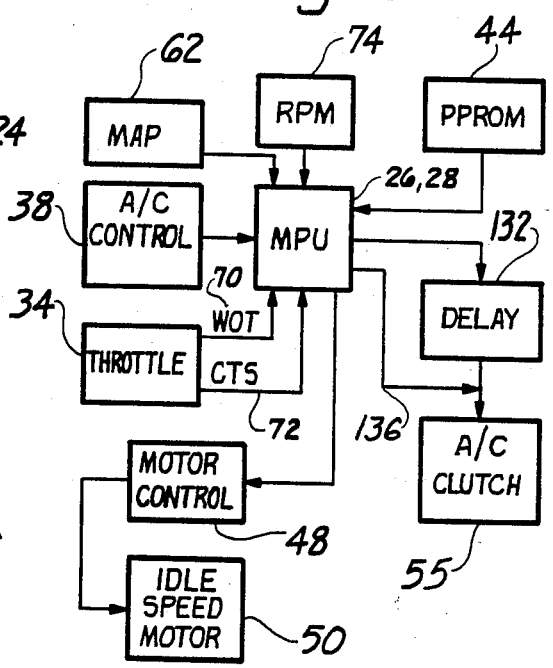

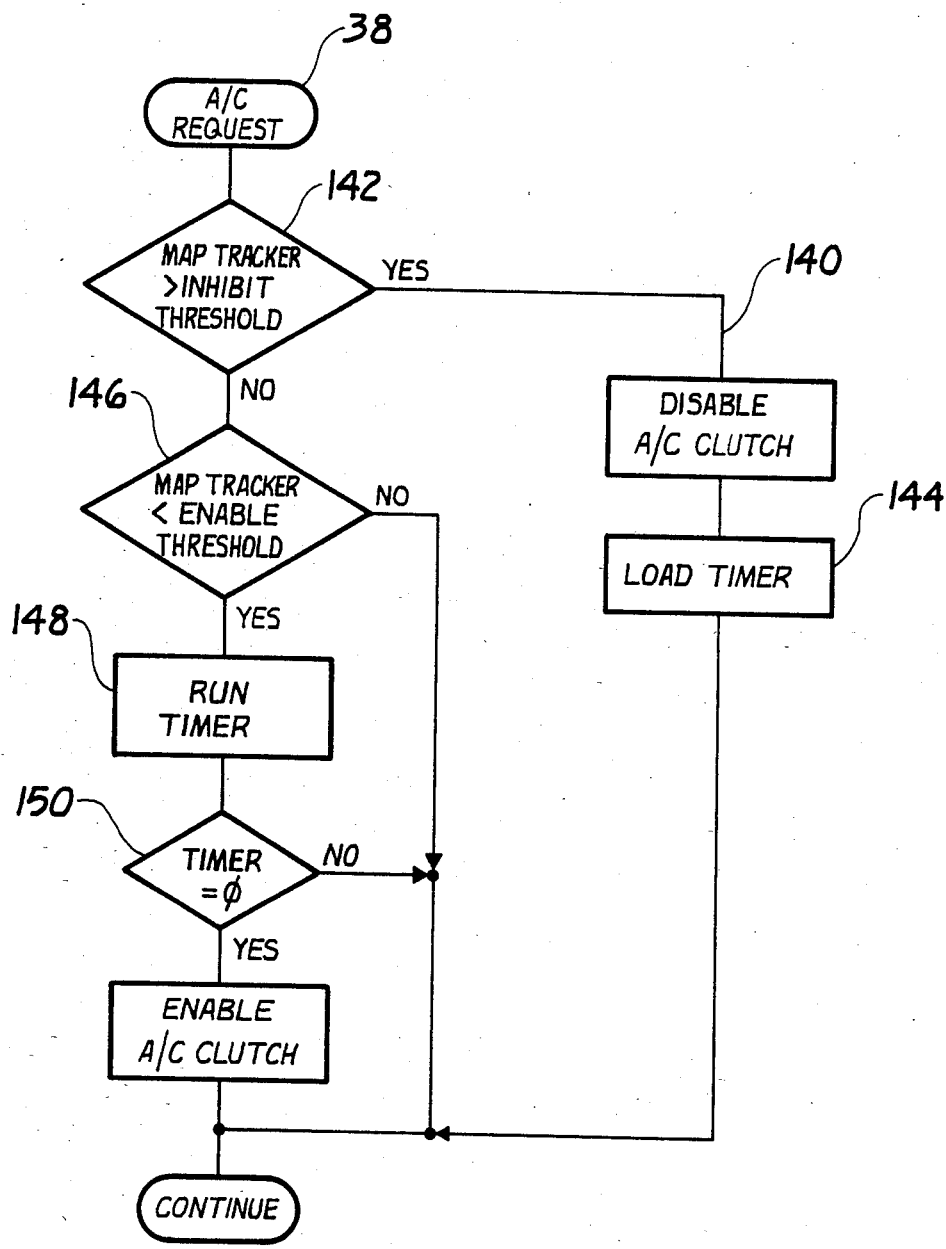
Fig·8

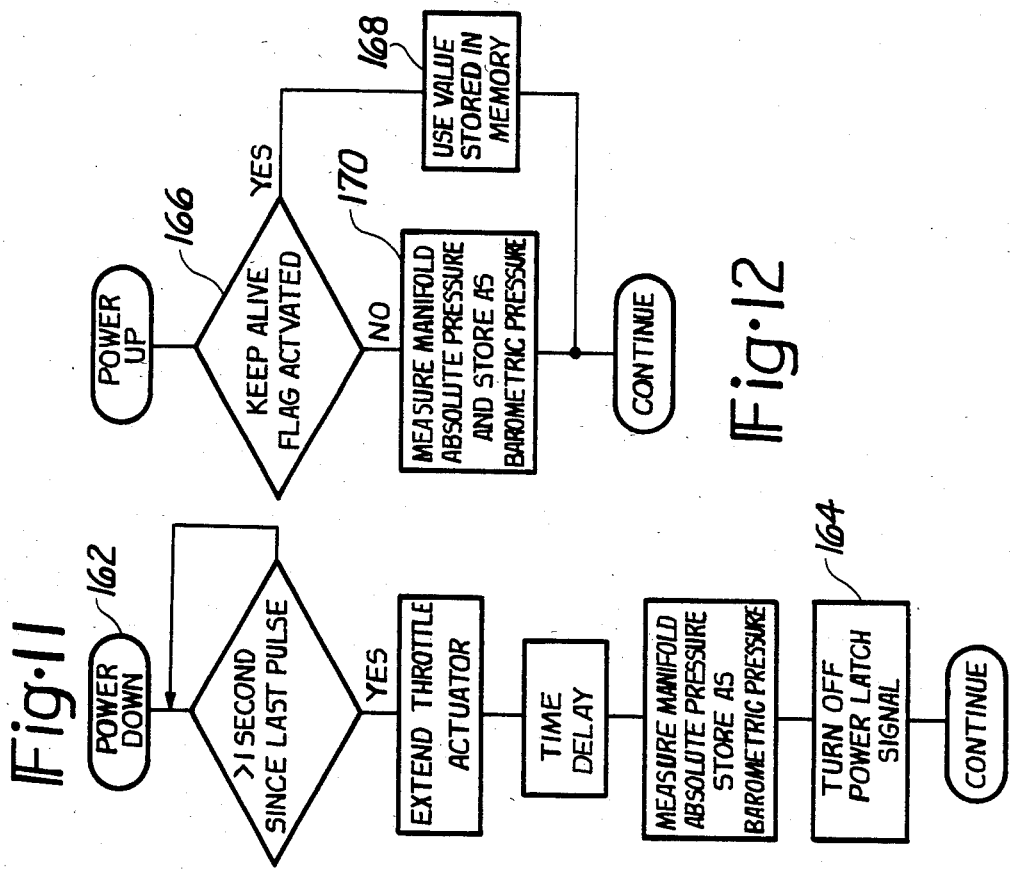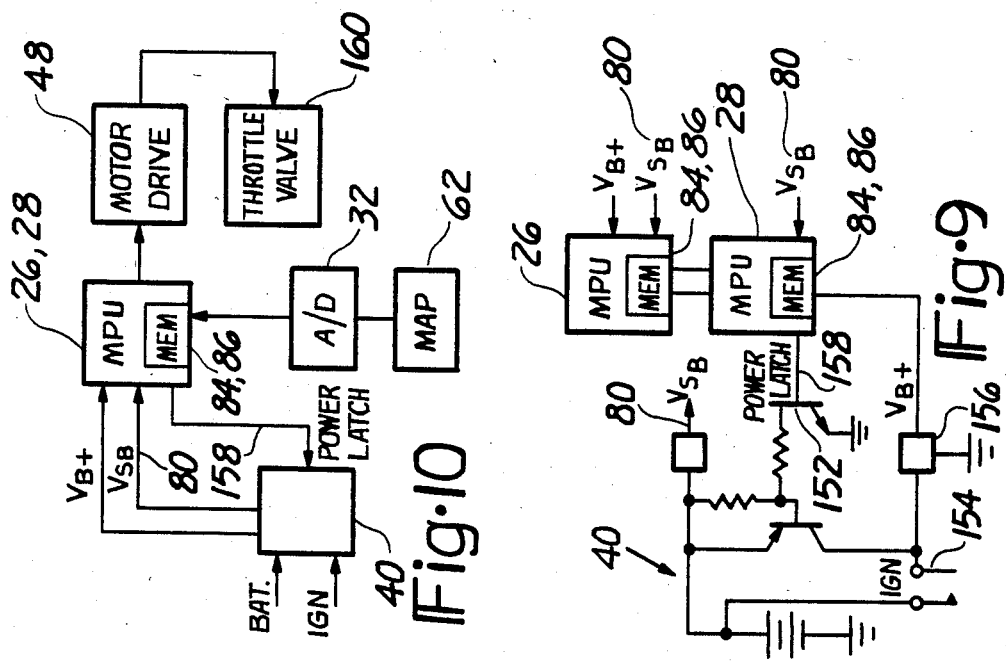

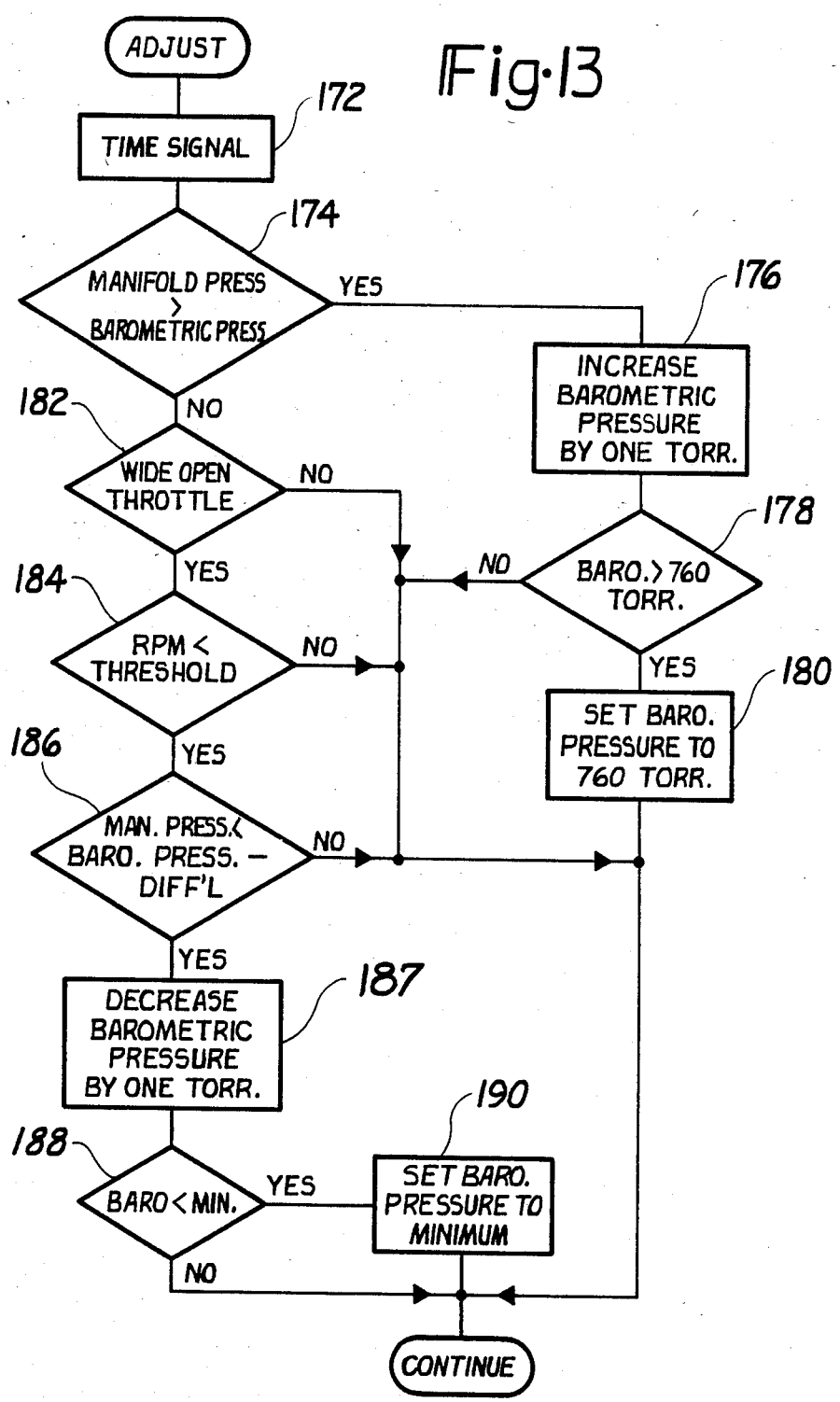

MEASURING BAROMETRIC PRESSURE WITH A MANIFOLD PRESSURE SENSOR IN A MICROPROCESSOR BASED ENGINE CONTROL SYSTEM

This invention relates to microprocessor based engine control systems in general and more particularly to measuring barometric pressure with a manifold pressure sensor in a microprocessor based engine control system in internal combustion engines.

Electronic fuel injection systems essentially had their beginning with the commonly assigned U.S. Pat. No. 2,980,090 entitled "Fuel Injection System" by R. W. Sutton et al which issued on Apr. 18, 1961. The system described therein is a hybrid system using vacuum tube circuits and mechanical switches for processing the fuel quantity signal. The control laws of the system are based on the speed of the engine and the value of the vacuum in the intake manifold commonly called a speed density system. Atmospheric pressure is measured by an air responsive member actuating a resistor and is operable at the idle speed range. The system is an analog system.

One of the first digital systems is described in the commonly assigned U.S. Pat. No. 3,964,443 entitled "Digital Engine Control System using DDA Schedule Generators" by T. Hartford which issued on June 22, 1976. This is also a speed density system. This system utilizes digital differential amplifiers, DDA, to interpolate along the surfaces of a three dimensional engine speed-fuel-manifold air pressure schedule. Barometric pressure is not measured. In this manner the fuel quantity signal is determined and generated.

A microprocessor based digital system is described in the commonly assigned U.S. Pat. No. 4,255,789 entitled "Microprocessor Based Electronic Engine Control System" by Hartford et al which issued on Mar. 10, 1981. This is a speed density system using a single microprocessor control having expanded memory units and interconnecting circuitry to store the various engine control laws. The system is an advancement over the existing state of the art in that it is more accurate in the calculation of the fuel control laws and controls more output devices such as the fuel pump, exhaust gas recirculation (EGR) valves and the like. In addition, capability is provided for the handling of closed loop control.

In each of the above digital systems, the generation of the fuel quantity of fuel injection signal as a function of the barometric pressure was not performed.

In the present system, the manifold pressure is interrogated at various, well defined intervals during the system operation to record the pressure being sensed by it. One such time is after engine turn off. The throttle valve is opened to wide open throttle position and the electrical signal from the sensor is stored as the barometric pressure. Other times are during engine operation when, through knowing the effect of certain engine operations, the value of the pressure surrounding the manifold sensor is known to be atmospheric. The updated value of barometric pressure is stored and used in the fuel quantity calculations. An example of this system is described in a February 1983 SAE Technical paper 830442 entitled "EFI for the 80's—A Base Model Fuel Control System" by Russo and Pauwels.

It is therefore an advantage of the present system to continuously update the barometric pressure valve for use in fuel quantity calculations in a microprocessor based engine control system.

It is another advantage to continuously update, in a step-wise manner, the stored value of barometric pressure during engine operation.

INCORPORATION BY REFERENCE

This application is one of five applications filed on May 27, 1983, all commonly assigned and having substantially the same specification and drawings, the five applications being identified below:

| Serial Number | Title |
| --- | --- |
| 499,110 | Multiprocessing Microprocessor Based Engine Control System For An Internal Combustion Engine |
| 499,112 | Measuring Barometric Pressure With A Manifold Pressure Sensor In A Microprocessor Based Engine Control System |
| 499,113 | Microprocessor Based Engine Control System For Controlling Heavy Engine Loads |
| 499,114 | Single Crystal Dual Microprocessor Computing System |
| 499,115 | A Method For Maintaining The Integrity Of A Dual Microprocessor Multiprocessing Computing System |

DESCRIPTION OF DRAWINGS

These and other advantages will become apparent in the following detailed description and drawings:

FIG. 5 is a flow chart of the Watchdog System on system turn on;

FIG. 6 is a block diagram of a subsystem for removing heavy engine loads during extreme ranges of engine power demand;

FIG. 8 is a flow chart of the map tracker system;

FIG. 9 is a schematic of a power latch subsystem;

FIG. 10 is a schematic of the power latch subsystem for measuring the barometric pressure of the engine environment;

FIG. 11 is a flow chart of the barometric pressure adjustment during engine turn off;

FIG. 12 is a flow chart of the barometric pressure adjustment during engine turn on;

FIG. 13 is a flow chart of the barometric pressure adjusted during engine operations.

DETAILED DESCRIPTION

Figure 1:
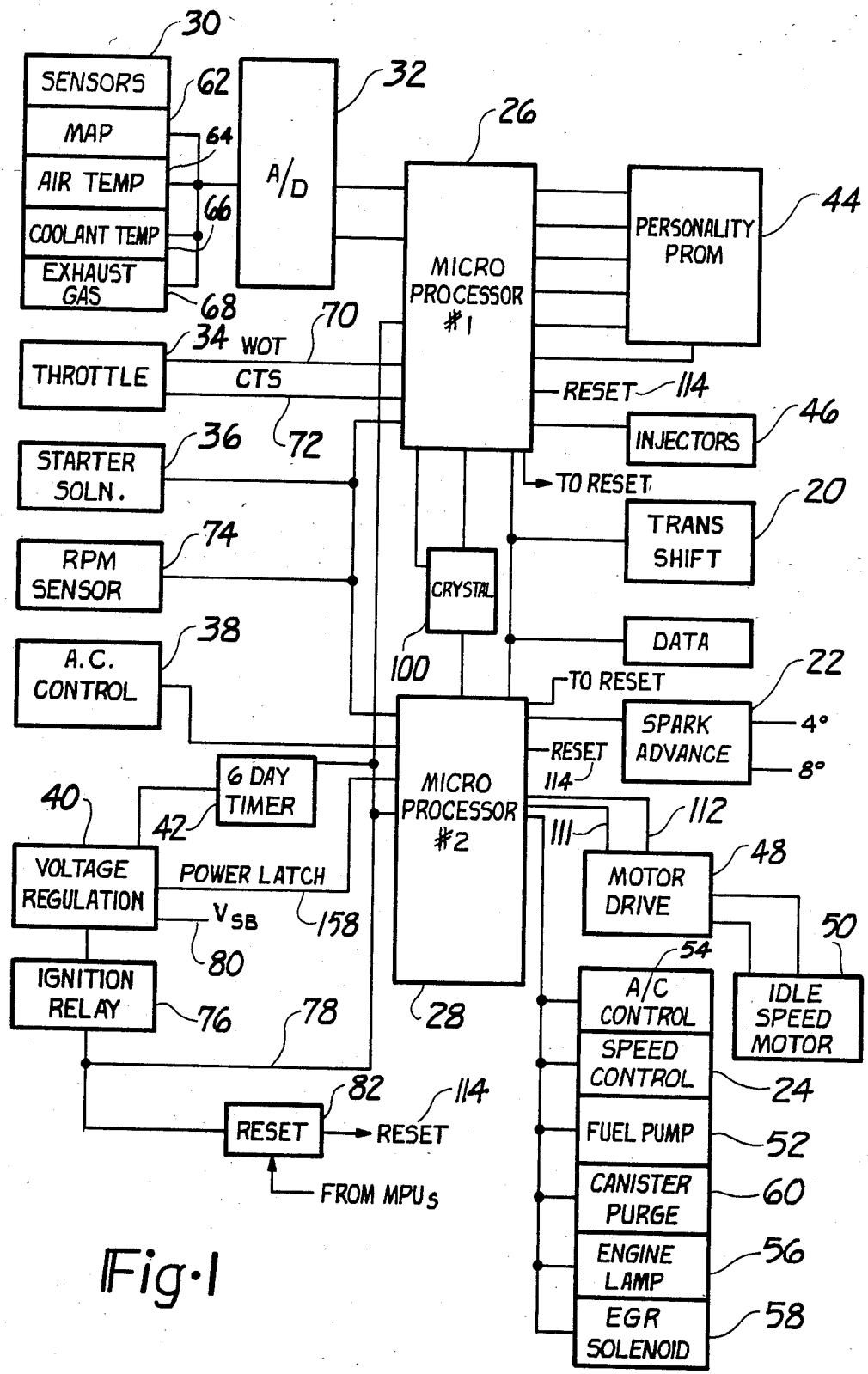
FIG. 1 is a block diagram of the microprocessor based fuel injection system according to the present invention.

Throughout the following description, the words "microprocessor", "processor", and "microcomputer" and "MCU" and "MPU" are used interchangeably to identify the same elements namely reference characters 26 and 28.

Referring to the FIGURES by the reference characters there is shown in FIG. 1 a dual microprocessor based engine control system for an internal combustion engine. The particular system is dedicated mainly to fuel management although other engine control functions such as transmission shifting 20, ignition timing and control (spark advance) 22, speed control 24, etc. may either be added or the system dedicated to such function or functions.

As previously indicated, the multiprocessing microprocessor based engine control system may include control laws for generating signals for other engine functions. The information generated by the microprocessors (MPU) 26 and 28 is capable of being used to control transmission shifting either by generating signals which directly actuate the shift mechanisms or by generating a lamp signal. The lamp signal is supplied through an appropriate lamp driver circuit to turn on a lamp at those times when shifting should occur. Such a lamp may be on an instrument panel in front of the engine operator.

Ignition control including spark advance 22 are also functions which the system can control. In particular in FIG. 1 the system generates two signals to advance the spark of a spark ignited internal combustion engine by either four or eight degrees. In a compression ignited engine (diesel) the timing of injection may be adjusted according to engine loads and operating characteristics.

The system is a closed loop speed density system having a plurality of engine mountable sensors 30, an analog to digital converter 32, throttle position switches 34, a starter solenoid responsive circuit 36, air conditioner control 38 circuitry capability, means for receiving power 40 and a timer 42 all of which supply inputs to a pair of microprocessors 26, 28 interconnected in a multiprocessing configuration. Also supplying inputs to the first microprocessor 26 is a Programmable Read Only Memory (PROM) 44 containing information peculiar to a particular engine calibration. The output devices which are actuable by one or more control signals from the MPUs 26, 28 are injectors 46, an ignition circuit 22, an idle speed actuator including a motor drive 48 and an idle speed motor 50, an electrically responsive fuel pump 52, air conditioner controls 54, an engine warning lamp 56, an EGR solenoid 58 and a control 60 for purging the fuel evaporation canister.

The plurality of engine mountable sensors 30 provide signals having informational value representing engine operating conditions. The output of each of the sensors 30 in the preferred embodiment is an analog signal which is supplied to an analog to digital (A/D) converter 32. The A/D converts the analog signal value into a digital signal having the same informational value as the analog signal. One of the sensors is a manifold absolute pressure (MAP) sensor 62 functioning to provide information relative to the absolute pressure in the intake manifold. As is well known, the amount of manifold pressure when coupled with other information, such as speed, is an indication of the fuel requirements of the engine.

A pair of temperature sensors, one for measuring the temperature of the air 64 inducted by the engine and a second for measuring the temperature of the engine coolant 66, generate output electrical signals representing the temperature of the fluid in which they are placed. For closed loop control, an exhaust gas sensor 68 is placed in the exhaust system to sense the amount of combustion of the fuel charge by the engine. In particular, an oxygen sensor measures the amount of oxygen in the exhaust gas remaining after engine combustion. The information from this sensor will regulate the fuel air ratio according to the control laws resident in the microprocessors.

The throttle position switches 34 generate an analog voltage signal which indicates the two extreme positions of the throttle valve. These positions are important to the control laws because they indicate wide open throttle (WOT) 70 and closed throttle state (CTS) 72.

The starting solenoid of the engine is operatively coupled to a starter solenoid response circuit 36 to provide a signal indicating that the engine operator is starting the engine and signifying to the control laws the need for an enriched fuel quantity signal.

A speed sensor 74 which measures the speed of an engine member provides the necessary engine speed information. Such a sensor 74 may measure the rotational speed of the engine crankshaft of a conventional internal combustion engine or the rotor speed of a Wankel engine.

In some applications, an air conditioner or other heavy engine load device is operatively coupled to a control responsive circuit 38 to generate one or more signals indicating that the load has been selected and it is operating. As will be shown, during certain engine operating conditions, the demands on the engine for power are such that certain loads should be disconnected. Air conditioning units 54 are one such load, and the engine control systems through its control laws will perform such a disconnect operation.

A power supply receiving means 40 receives both battery power and through an ignition relay 76, ignition switched power 78 for supplying electrical power to the control system. Unswitched battery power is used to maintain standby voltage 80 on certain volatile memories containing updated calibrations during the times that the engine is nonoperating. The ignition switched power 78 is used to power the control system during engine operating times upon demand of the engine operator.

Also contained in the power receiving means is a reset control 82 for responding to a sudden deregulation of the regulated supply voltage supplied to the microprocessors 26, 28. It is important that if there is a deregulation in the voltage, that microprocessors be immediately reset in order to prevent spurious and undesirable signals from generating incorrect data. Such a reset control system 82 is found in the commonly assigned U.S. Ser. No. 288,591 now U.S. Pat. No. 4,433,390 and entitled "A Power Processing Reset System for a Microprocessor Responding to a Sudden Deregulation of a Voltage" filed on July 30, 1981 by Carp et al which is expressly incorporated herein by reference.

As a safety factor and in order to reduce the drain on the engine power supply during very long periods of uninterrupted nonoperability, a timer 42 which is responsive to the ignition switched power 78 is used to maintain standby voltage for a given period of time. In the preferred embodiment this time is greater than five days, although such a time is merely a design selection. Such a selection of time should result in a time period measured in days as opposed to a period measured in minutes or hours. When the timer 42 times out because the engine has not been operated for a period of days, the updated engine calibrations are lost and the control system reverts back to its base line calibrations.

A Programmable Read Only Memory (PROM) which we call a Personality Programmable Read Only Memory (PROM) 44 is provided with preprogrammed system calibration information. The PPROM 44 supplies all of the calibration constants for the engine control laws and adapts the control system to a particular engine. In particular, the PPROM 44 is a 256-byte PROM.

Figure 2:
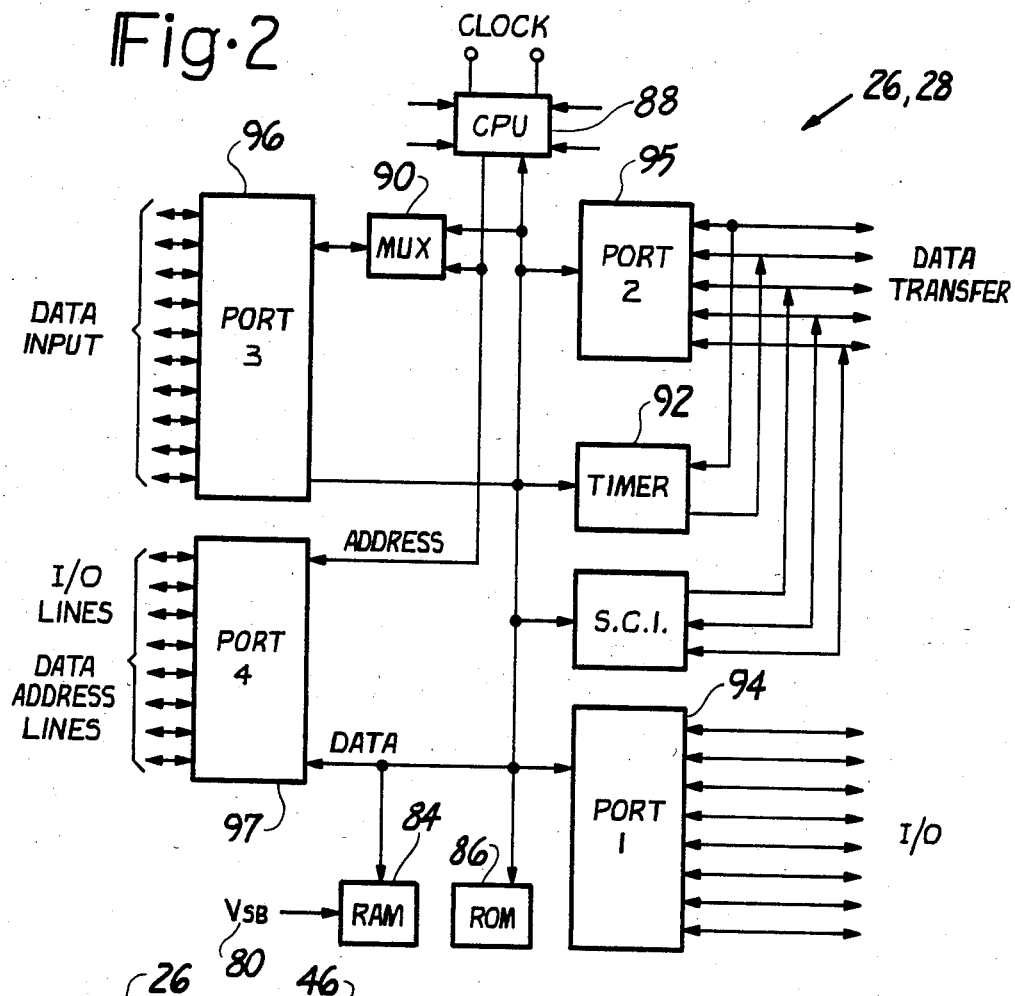
FIG. 2 is a block diagram of a microcomputer unit (MCU)

All of the above input devices supply information to either or both of the dual microprocessors 26, 28. As previously indicated a microprocessor based system is described in U.S. Pat. No. 4,255,789 which is incorporated herein by reference. The U.S. Pat. No. 4,235,789 contains a detailed description of one of the microprocessors which description is similar to the microprocessors in the preferred embodiment. The particular microprocessor unit (MPU) or microcomputer unit (MCU) used in the preferred embodiment is a Motorola, Inc. unit MC6801 which is an improved unit of the MC6800 described in the U.S. Pat. No. 4,255,789. As is well known, each MPU has storage means in the form of Random Access Memories (RAM) 84 and Read Only Memories (ROM) 86, central processing unit 88, a multiplexor control 90, timers 92 and a plurality of input-output ports 94–97 for receiving or transmitting signals to various input-output devices. FIG. 2 is a block diagram of the microprocessors. Sometimes an MCU is defined as including an MPU, program memory and often certain I/O control. If this definition is followed the MC6800 is an MPU and the MC6801 is an MCU. In this specification the term MPU is used in the generic sense with the understanding that if an MCU is to be used the necessary modifications will be made.

The dual MPUs 26, 28 are electrically connected together in parallel to calculate from information generated by the various sensors 30, the several output control signals required by the engine control laws. The tasks required are divided by the dual MPUs wherein the first MPU 26 is assigned the task of calculating the fuel quantity signals according to stored engine control laws and calibration constants and transmitting the calculated information to the second MPU 28 for calculation of the control signals to operate various electromechanical devices controlling fuel 46, emissions 58, warning lights 56, idle speed device 48, 50 and spark ignition 22 functions.

A single frequency determining element or crystal 100 is used with the dual MPUs instead of the conventional crystal controlled oscillator with an output buffer. The single crystal 100 is so interconnected with the MPUs 26, 28 that the first MPU 26 operates as the master MPU and operates to synchronize the operation of the second MPU 28 as the slave MPU.

The fuel quantity signal from the first MPU 26 is transmitted to the injector driver circuit 46 which is operatively connected to an electromechanical fuel injector mounted in the engine and upstream of the intake valves of the cylinders. If the system is a multi-point system, the several injectors are mounted to discharge fuel in the intake manifold upstream of the intake valve of each cylinder. If the system is a single point system, one or more injectors are mounted in the throttle body upstream of the throttle valve. For the purposes of the invention herein, when the multiprocessing microprocessor based engine control system is used for fuel management, the configuration and number injectors is not a constraining limitation.

The fuel quantity signal determines the initiation and duration of the actuation of the injector and the duration of actuation determines the amount of fuel injected into the engine. The injector driver circuit 46 may be that described in the commonly assigned U.S. Pat. No. 4,238,813 entitled "Compensated Dual Injector Driver" by Carp et al which issued on Dec. 9, 1980 and is expressly incorporated herein by reference.

Figure 3:
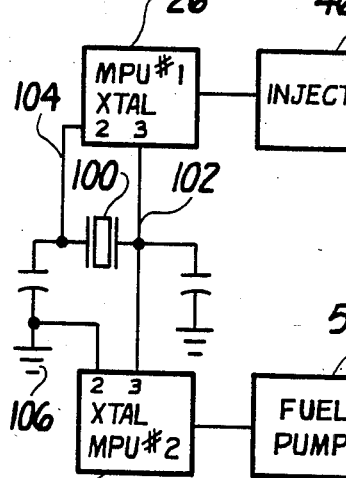
FIG. 3 is a schematic diagram of a dual microprocessor system with a single oscillator.

Before describing the operation of the dual microprocessor base electronic engine control system, the function and operation of the several blocks of the block diagram of FIG. 1 will be described. As previously mentioned the dual microprocessors 26, 28 are driven by a single frequency determining element 100 which in the preferred embodiment is a crystal connected in such a manner that the first MPU 26 operates as the master MPU and operates to synchronize the operation of the second MPU 28 as the slave MPU. Referring to FIG. 3, in the particular MPU selected, the input pins 2 and 3 are used to connect an externally driven crystal 100 to drive the MPUs. Inside the input ports of the MPUs are a divide-by-four circuit which takes the input frequency and divides it by four which then is the frequency of the MPU. Other frequency determining elements that may be used are ceramic resonators, LC tanks, etc.

There are three ways in which to hook up the single crystal 100 to the MPUs 26, 28. The most conventional way is to connect the crystal to an oscillator circuit to drive the oscillator. The output is then connected through a buffer amplifier to provide the necessary drive current for operating the MPUs. In another way, which is unconventional, the crystal is connected in parallel with each MPU. This results in the strongest MPU being the master and the other the slave. However, in the preferred embodiment it is desired to have one particular MPU 26 act as the master MPU and this is the microprocessor which controls the fuel injector 46. Therefore, as shown in FIG. 3 the output 102 of the crystal 100 is connected and parallel to each of the MPUs and more particularly to pin 3 of each microprocessor 26, 28 and the return side 104 of the crystal 100 is connected to the second input, pin two, of the master microprocessor 26. In the slave microprocessor the second input to the microprocessor, pin two, is connected to ground 106. MPU No. 1, 26, will therefore assume the master role and the MPU No. 2, 28, will assume the slave role.

If it does not matter which microprocessor is the master and which is the slave microprocessor, remove the ground 106 from pin two of the second microprocessor 28, and connect it to the return side 104 of the crystal 100 or to pin 2 of the first microprocessor 26. In that manner, the crystal 100 would drive both MPUs at the same time and the stronger MPU would take over.

The advantage of the single crystal 100 is that an oscillator circuit and a buffer amplifier is omitted thereby reducing the chip count of the system.

Figure 4:
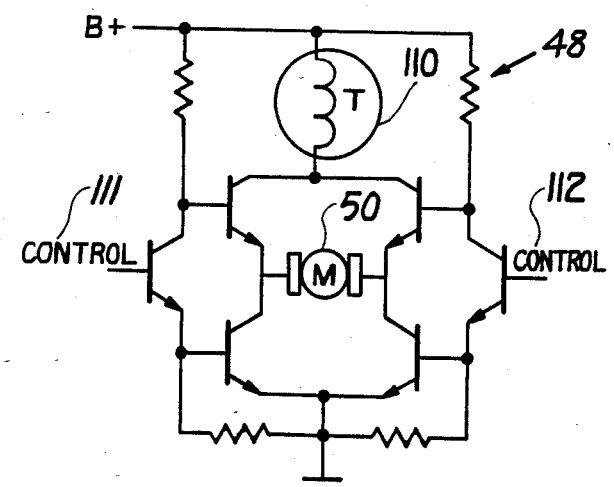
FIG. 4 is a schematic of a motor driver circuit.

The use of the single crystal 100 with dual parallel microprocessors operates to synchronize the two microprocessors. The effective output impedance of the two microprocessors is reduced thereby permitting the use of crystals with higher series resistances. This operates to provide higher drive capability from the crystal; faster start up times for the oscillator in the microprocessors 26, 28 and higher oscillator amplitudes for better operation:

Referring to FIG. 4 there is illustrated therein a schematic of a motor driver 48 as may be used in the present invention. The motor driver is basically a conventional "H" driver circuit wherein there is an addition of a positive temperature coefficient (PTC) varistor 110 in the supply line to the driver bridge. Connected to the output of the driver bridge is a reversible DC motor 50 which rotates in either direction depending upon which control signal 111, 112 to the driver 48 is active. In the conventional prior art "H" driver circuit if the motor stalls or the rotor shaft short circuits or if there is a ground fault, the bridge circuit attempts to drive the motor resulting in high current loads and excessive transistor driver dissipation.

Under normal operation the varistor 110 looks like a short circuit as it has a very low resistance. However, if the motor 50 fails the current through the varistor 110 will cause the varistor to heat up rapidly increasing its resistance and decreasing the current to the motor 50. Eventually the varistor 110 will effectively reduce the motor current and prevent the destruction of not only the motor 50 but more particularly the control circuits and the motor driver circuit 48. After the removal of the fault condition the varistor 110 will return to its normal resistance value and normal operation.

In the particular embodiment the running motor current is 0.25 amps and the starting current is 1.5 amps at a 12 volt supply. The varistor 110 has a normal resistance of 2.5 ohms with the switch point temperature of approximately 120° C.

The reset signal 114 in the dual microprocessor control system operates when activated to reset the microprocessors 26, 28 to a known hardware and software initial state. As shown in the block diagram of FIG. 1, when the engine is initially turned on, the ignition relay 76 sends a voltage signal to the reset circuit 82 which generates the reset signal 114 initializing the microprocessors 26, 28 to begin control of the engine. To this conventional use of the reset circuit, the system of FIG. 1 has a Watchdog System which checks each microprocessor to determine that it is operable both initially and during the operation of the control system. This system is illustrated in FIG. 5.

After initial turn-on of the system, step 116, through the reset signal 114 both microprocessors 26, 28 are placed in their baseline operation wherein the hardware and software are in their initial state. Immediately after initializing, the first microprocessor 26 tests the Personality Programmable Read Only Memory, PPROM 44, to determine that the information contained therein has not been destroyed. This is done by reading a check sum, step 118 of all the information contained therein from a predetermined byte location and comparing, step 119 such sum with an identical sum located in the memory of the microprocessor 26, step 120. In one embodiment, the check sum in the PPROM 44 is contained in the first byte read from the PPROM 44. This check sum has been previously calculated from the digital value of all the information contained in the PPROM. The check sum is loaded into the PPROM when the particular engine calibration constants are loaded in the PPROM 44. The check sum in the microprocessor 26 is a pre-arranged number which correctly identifies a proper PPROM 44 for the particular engine being controlled. If the check sum from the PPROM is not equal to the check sum 120 located in the microprocessor 26, the microprocessor sends out a control signal 122, not equal, to the reset circuit 82 which then generates the reset signal 114 initializing the microprocessor 26. Once the microprocessor 26 is reinitialized, the microprocessor 26 then attempts again to check the PPROM 44 by comparing, step 119 the check sum from the PPROM 44 with the check sum in its own memory. If the check sums are not equal the microprocessor resets and attempts again.

Assuming that the comparison, step 119, of the check sum in the microprocessor with the check sum in the PPROM 44 is correct, the first microprocessor 26 then transmits, step 124, a portion of the data to the second microprocessor 28. During this transmission, step 124, a check sum of the transmittted bits is accumulated in the transmitting MPU 26 by counting all of the transmitted bits. The second microprocessor 28 at the same time activates a timer which is set to a predetermined period of time sufficient that all the data during this operation should be transferred. If the second microprocessor 28 does not receive the data within the pre-set time of the timer, step 130, the second microprocessor 28 generates a signal to the reset circuit 82 which causes both microprocessors to reset.

However, if the data is transmitted, the second microprocessor 28 will calculate a check sum of the data received, step 126, retransmit that check sum back to the first microprocessor 26 which will compare that check sum with the check sum it accumulated, step 128 and if they are unequal, the first microprocessor 26 will generate the reset signal 114.

Additionally, if the first microprocessor 26 through its timer which was initiated when transmission was begun between the two microprocessors, times out before the check sum has come back from the second microprocessor step 130, then the first microprocessor 26 declares a fault indicating an error in the system and generates a signal to the reset circuit 82 resetting the microprocessors. All of the above operations take place immediately upon turn on of the dual microprocessor based engine control system. However, once the system is operational and running, the second microprocessor 28, on a predetermined time basis, will periodically recalculate the check sum from the information received from PPROM 44 via the first microprocessor 26 to see whether any of the constants stored in its memory has been corrupted. The reason for this is that since the information received from the PPROM 44 is stored in a RAM 84, a read-write memory, the contents could become corrupted. Again, if the recalculated check sum does not match the previous check sum stored in the memory, the microprocessors 26, 28 are reset.

Figure 7:
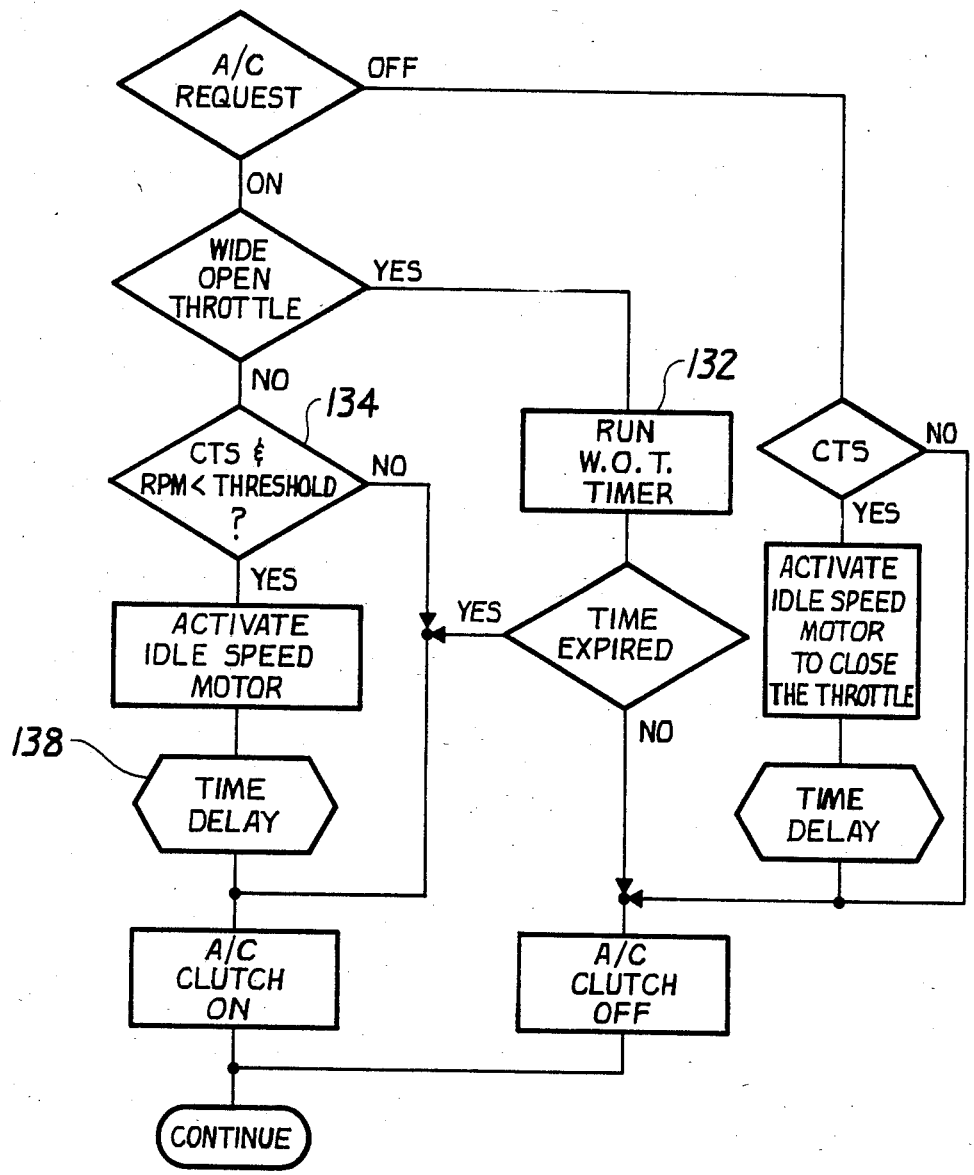
FIG. 7 is a flow chart of the a.c. control system.

Referring to FIG. 6 there is a block diagram of the special circuitry contained within the engine control system which operates to remove heavy engine loads during either high or low power demands of the engine. In particular FIG. 6 is a block diagram which illustrates the control of a compressor clutch 54 on an air conditioner as may be found on the motor vehicle and FIG. 7 is a flow chart of the control system. With the present small internal combustion engine, the output power of the engine is small. At wide open throttle when the engine's operator is demanding maximum power from the engine, the microprocessors 26, 28 will generate an actuation signal to open up the circuit to the air conditioner clutch 54 thereby disconnecting that load from the engine. In a similar manner at the opposite extreme end of the operating range of the engine, namely at idle condition the operation of the clutch is delayed while the idle engine speed is increased.

In this system, the microprocessors 26, 28 receive signals from the various sensors 30 indicating the operating condition of the engine, the request for operating the heavy load 38 together with additional control data representing certain characteristics of the engine. The microprocessors 26, 28 will determine whether or not an actuation control signal will be supplied to the large engine power consuming unit attached to the engine. If the unit is an air conditioner compressor, this actuation signal will cause engagement or disengagement of the clutch control means 55. Likewise under certain conditions the microprocessor will cause the engine speed to be slightly increased prior to allowing the engagement of the clutch or the connection of the heavy engine load to the engine.

In particular, referring to FIGS. 6 and 7 before the clutch is engaged, the air conditioner (a/c) control 38 generates an A/C request signal 738 either from the engine indicating that the air conditioner should be turned on or from any of the temperature controls within the air conditioner indicating that the compressor should be operated. In either event, the a/c control request 738 is a request for a heavy engine load such as the compressor to be connected to the engine.

The a/c control request 738 is supplied to the microprocessors 26, 28. The microprocessors 26, 28 sense the throttle position switches 34 to determine if the throttle valve is in a wide open condition, WOT 70, indicating the demand for heavy power output from the engine. If the engine is operating in a wide open throttle condition, the actuation signal from the microprocessors 28 is sent to a time delay unit 132, either internal or external to the MPU, to delay operation of the compressor clutch 55 for a fixed period of time. This fixed period of time is design consideration which indicates that for a minimum predetermined period of time after the throttle of the engine is moved to wide open throttle, the air conditioning compressor clutch 55 will not be operated. This particular actuation signal from the microprocessors is typically generated when the engine is operating with the air conditioning clutch on and the vehicle operator indicates the demand for high power output from the engine. This delay will declutch the compressor from the engine thereby removing a significant load from the engine.

However, if throttle valve is not in a wide open position, the microprocessors sense the throttle position switches 34 for the CTS signal 72 indicating closed throttle. The microprocessors 26, 28 then interrogate the sensor 74 representing the speed of the engine to determine 134 whether or not the engine is operating at a speed greater than a threshold speed. In this instance, assuming that the engine is operating at a speed greater than the threshold speed and the throttle position switch does not indicate closed throttle, the microprocessor interrogates the PPROM containing the engine characteristics for air condition control and generates an actuation signal 136 to be supplied to the A/C clutch control means 55 of the compressor.

If the microprocessors determine that the engine is operating at or below the threshold speed as indicated by the signals from the RPM or speed sensor 74, the microprocessors will send the actuation signal to the motor control unit 48 which will cause the idle speed motor 50 to actuate. This idle speed motor will open up an air path feeding more air to the engine which in turn will cause more fuel to be supplied and the engine speed will increase. After a period of time, step 138, the engine speed is above the threshold speed and an actuation signal from a time delay means 132 activates the A/C clutch control means 55 to connect the compressor to the engine.

In addition if the engine load is rapidly being changed such as during acceleration or deceleration and neither throttle position switch 34, generally WOT 70 or CTS 72, is actuated, the microprocessors 26, 28 will generate an actuation signal to the clutch control means 55 of the compressor or heavy load to disconnect them from the engine. This is accomplished by means of a "MAP Tracker" system which senses rapid change in the output of the manifold pressure sensor 62 which occurs as the throttle valve is being moved. This rapid change is identified as MAP Tracker.

Referring to FIGS. 6 and 8, FIG. 8 is a flow diagram for the operation of the elements of FIG. 6 in the MAP Tracker System. The rate of change of the manifold pressure is calculated, step 142, and if it is greater than an inhibit threshold level indicating rapid engine acceleration the actuation signal to the clutch control means 55 is generated. The disengagement of the clutch disconnects the heavy loads from the engine. In addition to generating the actuation signal, a timer is loaded, step 144, with a predetermined constant representing a fixed period of time during which time the clutch will be disengaged.

Once the timer is loaded, the microprocessor continues to monitor the MAP Tracker to determine, step 146, when the rate of change becomes less than a fixed value which indicates that the engine demands are not being rapidly changed. Before this condition happens, and each time that the MAP Tracker value is between the inhibit and enable threshold values, the timer is maintained at its fixed constant. When the monitoring of the MAP Tracker indicates that the enable threshold value is greater, step 146, than the MAP Tracker value, the time is turned on, step 148, and allowed to run, that is time down from its preload value. When the timer reaches zero, step 150, the actuation signal is turned off and the clutch becomes engaged.

Reference to FIG. 7, when the a/c request signal is turned off, the MPU checks for the closed throttle state (CTS) 34. If the switch is activated indicating that the throttle is closed, the MPU activates the time delay 132 and also the motor control unit 48. The motor control activates the idle speed motor 50 to close down the throttle to its idle position in order that when the load is removed, the engine speed will be at idle and not advanced. After the time delay 132 times out, the clutch control means actuation signal is activated to remove the a/c load from the engine.

One of the voltages the voltage regulating circuit 40 is capable of regulating is a standby voltage 80 from the battery voltage. In the particular embodiment, the battery is twelve to fourteen volts and the voltage standby value is five volts. Typically the standby voltage 80 being very low in voltage is also extremely low in power. Therefore the battery loading is minimal and the regulator is capable of maintaining a standby voltage 80 for a long period of time even though the battery has not been recharged. The standby voltage 80 is supplied to the two microprocessors 26, 28 and is used thereby for maintaining a portion of its memory 84, 86 in its volatile state. When the standby voltage 80 is applied to the memories, a signal or flag 166 is actuated in memory 84 and will remain actuated until the standby voltage 80 is removed. Contained within this portion of the memory 84, 86 are the various calibrated update parameters which are representative of the engine as it is at the present time. These calibrations are as a result of information gained in real time from the several sensors and are used to modify the input characteristics from the PPROM 44. In the preferred embodiment the voltage standby regulator is operable for a time which is measured in terms of days through a timer 42 connected to output of the battery.

Referring to FIG. 9 there is illustrated a schematic diagram of a power latch subsystem for the engine control system. The particular function of this subsystem is to sense when the ignition to the engine is turned on for a period of time and then generate a Power Latch Signal 158 from the microprocessor. This Power Latch Signal 158 drives an actuator switch, a control transistor 152, which connects the battery voltage line in parallel with the ignition switch 154 to the $V_{B+}$ voltage regulating circuit 156. This connection maintains the battery voltage to the voltage regulating circuit until the Power Latch Signal 158 is turned off by the MPU 28. It does this by maintaining the base of a control transistor 152 such that the transistor conducts in parallel with the ignition switch 154. When the ignition switch 154 is opened, the Power Latch Signal 158 will keep the control transistor 152 in conduction for a fixed time. Thus, the timing of the Power Latch Signal 158 begins a predetermined time after the system has been turned on and the engine is operating and will remain for a fixed time after the system is turned off.

Referring to FIG. 10 there is illustrated in block diagramatic form a system utilizing the Power Latch Signal 158 for the purpose of measuring the barometric pressure of the environment in which the engine is located. In this particular subsystem, it is desired to measure the barometric pressure upon engine turnoff and to store this measured pressure into the volatile memory of the microprocessor as indicated in FIG. 11. When the engine is then restarted, at some future time, the microprocessor will address the memory for the barometric pressure and supply that information to the several calculations to determine the amount and quantity of the fuel or the operation of any of the other input-output devices as illustrated in FIG. 12.

As hereinbefore indicated and referring to FIG. 10, the Power Latch Signal 158 from the microprocessor 28 maintains the voltage supply for a time after ignition turnoff. The ignition signal being turned off to turn off the ignition of the engine or the engine speed being reduced to zero triggers the microprocessor 28 to actuate the motor drive control circuit 48 to operate a motor 50 attached to the throttle valve 160 for opening the throttle valve to a wide open throttle position. Through an internal timer in the microprocessor, a predetermined period of time is generated during which time the manifold pressure sensor 62 value from the A/D converter 32 is loaded into the memory 84, 86 in the area reserved for the value of the barometric pressure. At the end of timer, the Power Latch Signal 158 is turned off. The standby voltage 80 which is applied to the memory, maintains this information for the period of time that the standby voltage 80 is supplied to the microprocessor 84, 86. In the preferred embodiment the time delay between the engine turnoff and the measurement of the manifold pressure is four or five seconds. The throttle valve 160 can be fully opened in that period of time and the pressure surrounding the manifold pressure sensor 62 will be substantially equal to the barometric pressure of the environment. This period of time will be less than the period of time that the Power Latch Signal remains.

In summary and referring to FIG. 11, when the microprocessors receive a signal, step 162, indicating that the ignition has been turned off, the second microprocessor 28 immediately turns off the control signals to many of the output devices including the fuel pump relay 52 and activates the motor drive circuit 48. During the predetermined period of time after the ignition is turned off the first microprocessor 26 interrogates the manifold absolute pressure sensor 62 and stores its pressure value into its memory as the value of the barometric pressure. After the timer times out, the Power Latch Signal 158 from the microprocessor is turned off, step 164.

At the next engine operation, when the ignition system signal is supplied to the microprocessor, the microprocessor addresses memory to determine whether or not the standby or keep alive voltage has been maintained on the microprocessor. If it has, the signal or a flag, step 166, which was actuated remains indicating that standby voltage 80 has been maintained on the microprocessor. This flag is an indication to the microprocessor that the memory locations contain the updated information and to process the signals from the various sensors and inputs according to the most recent calibrations. In particular, the value of the barometric pressure which was stored in memory, step 168, as a result of engine turnoff is now used as the barometric pressure because in almost all cases the engine has not been relocated from its present environment and the pressure is approximately the same. If the flag is not actuated, then the signal from the MAP sensor 62 representing the value of the pressure surrounding the sensor, is stored, step 170, as the value of the barometric pressure.

During operation of the engine, if the engine is mounted in a motor vehicle, the engine location can change and the ambient barometric pressure can of course change. Such a condition may be due to the vehicle going up or down hill thereby changing the altitude of the vehicle. In order to continuously update the value of the barometric pressure stored in the microprocessor, the microprocessor following the process of FIG. 13, senses a signal, step 172, which indicates a known period of time such as half an engine revolution or one engine revolution or whatever particular design characteristic is necessary for the operation of the engine. Upon receiving this time signal which is typically generated by sensor sensing the rotation or movement of an engine member, the microprocessor reads the manifold pressure sensor 62 generates a pressure signal therefrom representing the value of the pressure surrounding the sensor. This value is then compared, step 174, with the value of barometric pressure stored in the memory to determine if the values are the same. If the value of the pressure signal is greater than the value of barometric pressure, this indicates that the engine is being moved from a higher elevation to a lower elevation. However, this could also indicate an ambient deviation in the ambient pressure.

Regardless of the condition, the microprocessor then addresses the memory location containing the value of barometric pressure and adds to that value one unit of pressure, step 176. In particular, this is one torr. This new barometric pressure value is then compared, step 178, with a predetermined fixed constant to determine whether it is greater than a maximum barometric pressure. In the particular embodiment, the values of the standard atmospheric pressure at sea level is 760 torr and under no conditions should the value of barometric pressure stored in memory exceed this number. If it does exceed this number, the microprocessor will write 180 the maximum barometric pressure value into memory. However if the new barometric pressure value is less than the maximum value the new barometric pressure value will be written into the memory location.

If the comparison of the value of the pressure signal and the value of barometric pressure results in the value of the barometric pressure being greater, the microprocessor interrogates, step 182 the throttle position switch to determine whether or not the throttle is wide open. If the throttle is not wide open, this indicates that the pressure being read by the manifold pressure sensor is the manifold pressure and not the barometric pressure so the microprocessor will not change the value of barometric pressure stored in the memory unit.

However, if the throttle is wide open the assumption made is that the pressure in the manifold is equal to the barometric pressure. The engine speed is compared, step 184, to a threshold speed and if the speed of the engine is greater than the threshold speed, this indicates a high load condition or high induction system pressure drop and the manifold pressure is not ambient pressure. If the speed of the engine is less than the threshold speed and the throttle is wide open an engine signal is generated, the value of the manifold pressure is compared with a value of the barometric pressure, read from the memory, minus a differential. The differential is a design constant representing the pressure drop across the throttle body from the ambient pressure to the manifold pressure. If, as shown in Block 186, the manifold pressure is less than the barometric pressure minus the differential indicating a drop in the ambient barometric pressure, the value of the barometric pressure in the memory is decreased by one torr as indicated in Block 187 creating a new barometric pressure. After the subtraction the new barometric pressure value is compared 188 to a second predetermined fixed constant representing the minimum barometric pressure value and if it is less, the microprocessor will not write the new barometric pressure value into the memory but will write, step 190, the minimum barometric pressure value into the memory location. However if the new barometric pressure value is greater, the new barometric pressure value is written into memory as the barometric pressure.

There has been shown a means for determining the barometric pressure value of the environment of the engine which is not subject to fluctuations in battery voltage. This value is stored in a volatile memory 84 or 86 as the value of the barometric pressure. Upon engine turnon the microprocessor interrogates the memory and if it finds that the standby voltage 80 has been maintained, the microprocessor will read the value of barometric pressure contained in the memory and use such value in its calculations. During operation of the engine, continuous update of the value of barometric pressure is made during proper engine operations when the manifold pressure sensor 62 is truly subjected to ambient pressure and not the pressure created by the engine. If at any time during the operation of the engine it is found that the value of barometric pressure is different than the value of pressure surrounding the MAP sensor 62, the value of barometric pressure, under certain conditions, is updated. Generally the manifold pressure should be less than the barometric pressure and other conditions selected by the microprocessor from the various engine sensors determine whether or not the manifold pressure sensor is being subjected to ambient pressure.

We claim:

1. In a microprocessor based electronic engine control system for an internal combustion engine, a method for measuring upon engine turnoff the ambient barometric pressure using a manifold pressure sensor, the method comprising the steps of:
    turning off the ignition of the engine;
    maintaining electrical power to the manifold pressure sensor for a period of time after the turning off of the ignition;
    actuating the throttle value to a wide open throttle position;
    generating a pressure signal from the manifold pressure sensor wherein the value of said pressure signal represents the ambient barometric pressure;
    storing the value of said pressure signal in the memory of the microprocessor as the value of the ambient barometric pressure; and then
    removing the electrical power to the manifold pressure sensor.

2. In the microprocessor based electronic engine control system according to claim 1 additionally including the step of applying a standby voltage to the memory of the microprocessor for maintaining the value of the ambient barometric pressure stored therein during the time the engine is turned off and setting a flag in the memory of the microprocessor indicating said standby voltage is on.

3. In a microprocessor based electronic engine control system for an internal combustion engine, a method for updating the stored ambient pressure signal by measuring the ambient barometric pressure during engine operation using a manifold pressure sensor, the method comprising the steps of:
    generating timing signals indicating the rotational position of an engine member and including a signal indicating a predetermined rotational position in the rotation of said engine member;
    generating a pressure signal from the manifold pressure sensor representing the pressure surrounding the sensor in response to said predetermined rotational position;
    reading the value of ambient barometric pressure stored in the memory of the microprocessor;
    comparing the value of the barometric pressure stored in the memory of the microprocessor and the value of said pressure signal;
    increasing the value of the barometric pressure by one unit to generate a new barometric pressure value when the value of said pressure signal is greater than the value of the barometric pressure;
    comparing the new barometric pressure value with a predetermined fixed constant representing the maximum barometric pressure; and
    storing in the memory of the microprocessor either the new barometric pressure value if equal to or less than said fixed constant or the value of the maximum barometric pressure if the new barometric pressure value is greater than said fixed constant.

4. In the microprocessor based electronic engine control system according to claim 3 where in said step of comparing the value of the new barometric pressure value, said predetermined fixed constant represents the value of the standard atmospheric pressure at sea level.

5. In a microprocessor based electronic engine control system for an internal combustion engine, a method for measuring the ambient barometric pressure during engine operation using a manifold pressure sensor, the method comprising the steps of:

generating timing signals indicating the rotational position of an engine member and including a signal indicating a predetermined rotational position in the rotation of an engine member;

generating a pressure signal from the manifold pressure sensor representing the pressure surrounding the sensor in response to said predetermined rotational position;

reading the value of ambient barometric pressure stored in the memory of the microprocessor;

comparing the barometric pressure stored in the memory of the microprocessor and the value of said pressure signal;

generating a control signal when the value of barometric pressure is greater than the value of said pressure signal;

determining both the throttle valve position and the speed of the engine;

generating an engine signal in response to a wide open throttle and an engine speed less than a threshold speed;

decreasing the value of the barometric pressure by one unit to generate a new barometric pressure value in response to the simultaneous occurrence of said control signal and said engine signal; and storing in the memory of the microprocessor the new barometric pressure value.

6. In a microprocessor based electronic engine control system according to claim 5 where in the step of generating an engine signal includes the steps of:

determining the position of the throttle valve;

generating a wide open throttle signal in response to the throttle valve being substantially at its furthermost open position;

measuring the frequency of the timing signals for generating an engine speed signal;

comparing the engine speed signal with a threshold speed signal in response to the furthermost open throttle signal; and then generating the engine signal when said engine speed signal is less than said threshold speed signal.

7. In a microprocessor based electronic engine control system according to claim 5 where in the step of decreasing the value of the barometric pressure includes the steps of:

comparing the new barometric pressure value with a second fixed constant representing a minimum barometric pressure; and then setting said new barometric pressure value equal to said second fixed constant when said comparison indicates that said second fixed constant is greater than said new barometric pressure value.

* * * * *